United States Patent
Davenport et al.

(10) Patent No.: US 8,335,876 B2
(45) Date of Patent: Dec. 18, 2012

(54) USER PROGRAMMABLE COMPUTER PERIPHERAL USING A PERIPHERAL ACTION LANGUAGE

(76) Inventors: Anthony G. Davenport, Berkeley, CA (US); John W. Hyde, Portland, OR (US)

(*) Notice: Subject to any disclaimer, the term of this patent is extended or adjusted under 35 U.S.C. 154(b) by 1578 days.

(21) Appl. No.: 10/876,111

(22) Filed: Jun. 24, 2004

(65) Prior Publication Data

US 2004/0263477 A1  Dec. 30, 2004

Related U.S. Application Data

(60) Provisional application No. 60/482,602, filed on Jun. 25, 2003.

(51) Int. Cl.
*G06F 13/12* (2006.01)
*G09G 5/08* (2006.01)

(52) U.S. Cl. .................................. 710/67; 345/163

(58) Field of Classification Search ............ 345/163, 345/167, 157, 158, 161; 710/67
See application file for complete search history.

(56) References Cited

U.S. PATENT DOCUMENTS

| | | | | |
|---|---|---|---|---|
| 5,724,558 A * | 3/1998 | Svancarek et al. | ........... | 703/21 |
| 5,990,872 A * | 11/1999 | Jorgenson et al. | ........... | 345/168 |
| 6,115,028 A * | 9/2000 | Balakrishnan et al. | ........ | 345/157 |
| 6,448,977 B1 * | 9/2002 | Braun et al. | .................. | 715/701 |
| 6,600,479 B1 * | 7/2003 | Smith et al. | .................... | 345/163 |
| 6,717,573 B1 * | 4/2004 | Shahoian et al. | ............. | 345/161 |
| 6,720,949 B1 * | 4/2004 | Pryor et al. | .................... | 345/158 |
| 6,731,268 B2 * | 5/2004 | Anton et al. | .................. | 345/163 |
| 6,894,678 B2 * | 5/2005 | Rosenberg et al. | ........... | 345/157 |
| 6,956,558 B1 * | 10/2005 | Rosenberg et al. | ........... | 345/156 |
| 7,126,582 B2 * | 10/2006 | Osborn | ......................... | 345/157 |
| 2002/0054011 A1 * | 5/2002 | Bruneau et al. | ............... | 345/156 |
| 2003/0006975 A1 * | 1/2003 | Moriya et al. | ................ | 345/179 |
| 2004/0174340 A1 * | 9/2004 | Bruneau et al. | ............... | 345/167 |

OTHER PUBLICATIONS

Gyration Ultra Cordless Optical Mouse & Mobile Keyboard, Nov. 6, 2002, ZDNet.co.uk, pp. 1-2.*

* cited by examiner

*Primary Examiner* — Ernest Unelus
(74) *Attorney, Agent, or Firm* — Howard Cohen

(57) ABSTRACT

A peripheral input device for a computer utilizes the USB (or equivalent) connectivity standard to deliver complex inputs to the computer. The input device includes an onboard microcontroller that uses the peripheral action language of the invention to generate the complex inputs in response to simple user inputs. The microcontroller is connected o) to an action table and sequence table and a library of Local Device emulation functions that are accessed in response to any user input (a local event) to determine the programmed action(s) to be generated in response to the event. The invention may be embodied in a mouse, keyboard, or other peripheral device, or in a stand-alone module connected between conventional input devices and a digital machine.

2 Claims, 11 Drawing Sheets

Prior Art -Typical PC Input Devices

Prior Art -Typical Game Console Input Device

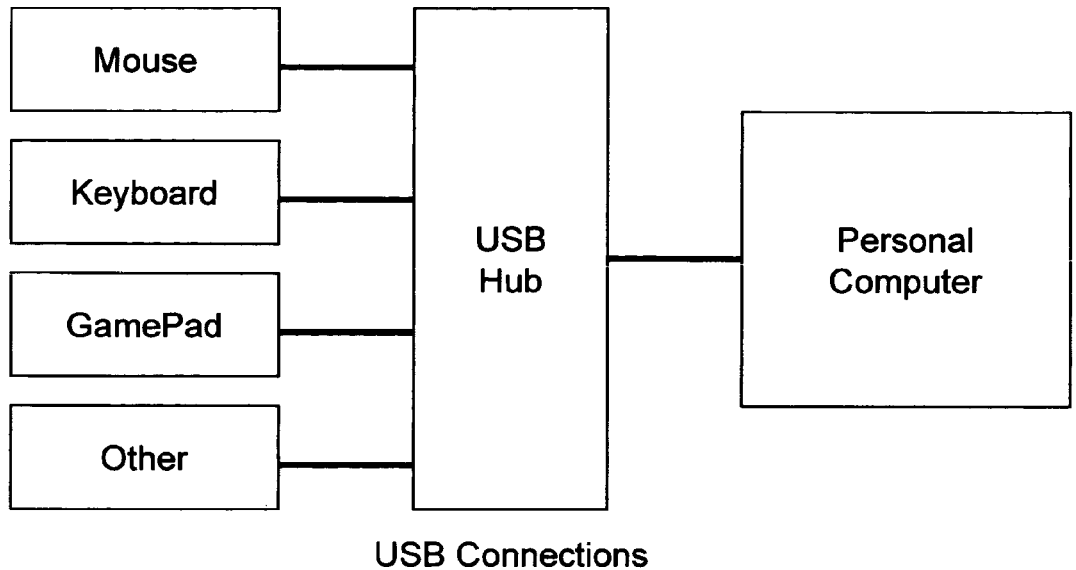
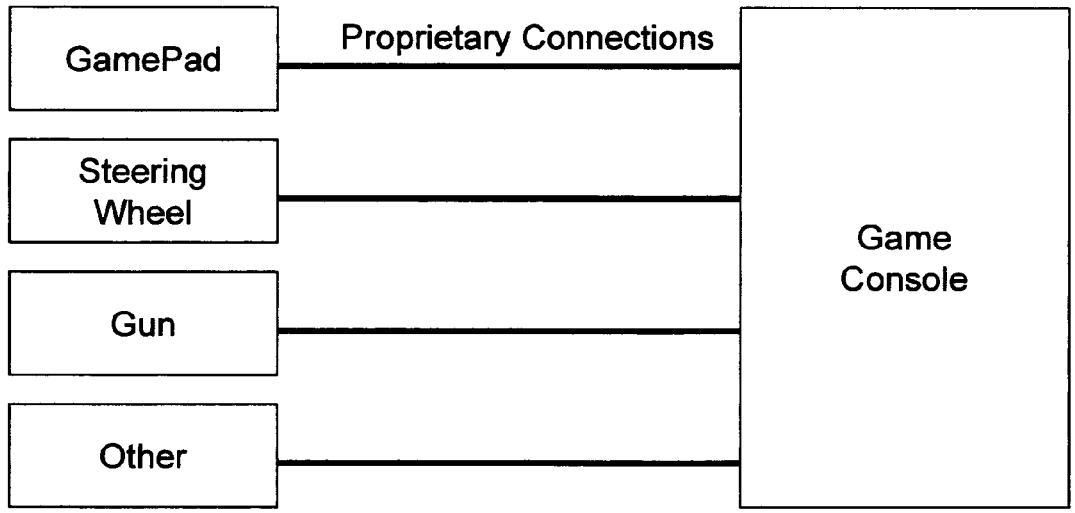
Prior art - Typical peripherals attached to a Computer
FIG. 3

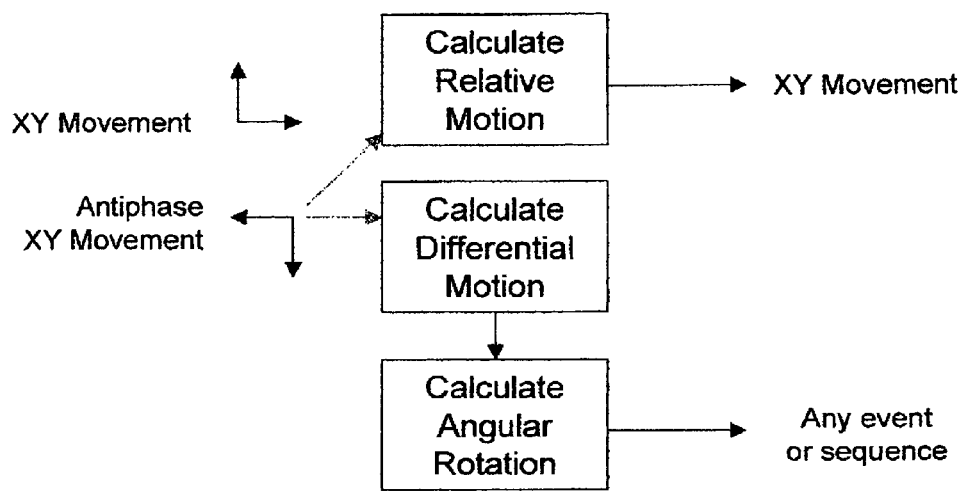
Figure 7. Using two sensors to measure rotate
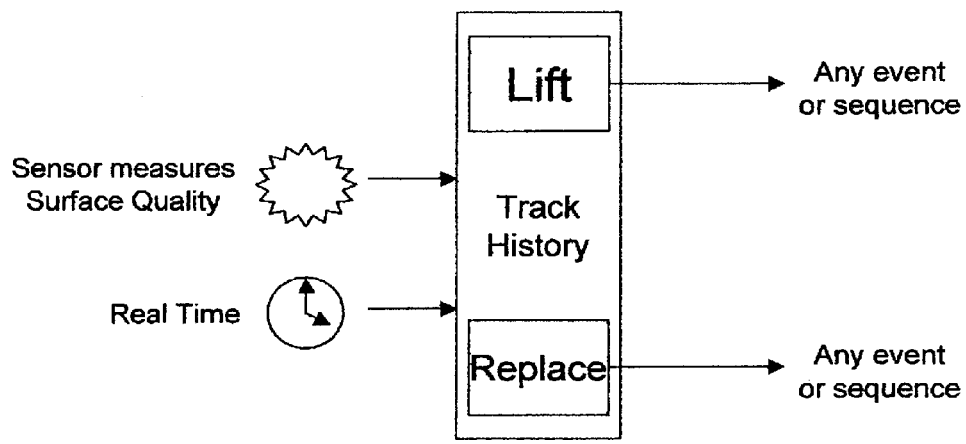
Figure 8. Tracking surface quality to determine lift/replace events M = Microcontroller
C = Capacitor
R = Resistor

USER PROGRAMMABLE COMPUTER PERIPHERAL USING A PERIPHERAL ACTION LANGUAGE

CROSS-REFERENCE TO RELATED APPLICATIONS

This application claims priority date benefit of Provisional Patent Application Ser. No. 60/482,602, filed Jun. 25, 2003.

FEDERALLY SPONSORED RESEARCH

Not applicable.

SEQUENCE LISTING ETC ON CD

Not applicable.

BACKGROUND OF THE INVENTION

1. Field of the Invention

This invention relates to a computer peripheral and, more specifically, to a "smart", user-programmable peripheral that is able to provide a wide range of standard user inputs, such as mouse, keyboard, game pad and joystick, including sequences, to a computer. The following terminology is used throughout this patent application:

Digital machine: an electronic device operated by a digital controller running a program, such as a computer, electronic appliance, or the like.

Computer: Throughout this document, the unqualified use of the term 'computer' is equated with a personal computer, a game console, an embedded computer system or any other similar reprogrammable computer.

Personal Computer: The term "personal computer" or PC, refers to a computer such as an IBM compatible, an Apple system, a Linux system or similar computer.

Game Console: The term "game console" refers to a computer generally dedicated to game playing, such as an Xbox, PlayStation, GameCube or similar system.

Peripheral Device: The term "peripheral device", or more simply, "peripheral" refers to an input and/or output accessory added to a computer to enable a user to provide input to, or receive output from, a computer. Examples include keyboard, mouse, game pad, joystick, steering wheel and similar devices.

Peripheral control: an input capturing component located on a peripheral such as a button or pad that translates the user's physical input to an electronic computer-usable signal. Typical controls are buttons which capture timed logical input, keyboard keys, and "analog" controls which capture values in a continuum, such as X/Y variables, usually for use in relating a data capture task.

Peripheral control input: The physical action taken by the user to actuate (cause a signal to be generated) a peripheral control. Examples include pressing a mouse button, moving a joystick, or tapping a keyboard key.

Peripheral output action: The command effect the user's control input achieves as interpreted by the current application software. Examples include a left mouse click signal, movement signal of the cursor, a scroll up signal, or the keystroke "a".

USB: The term "USB" refers to the USB peripheral expansion standard as defined by the USB Implementers Forum.

HID: The term "HID" refers to a Human Interface Device that is one of the classes of devices defined by the USB specification specifically to support peripherals.

1. Description of Related Art

Interactive user input to a personal computer is typically implemented using a mouse and a keyboard. Modern PC applications programs, such as typical Digital Image Manipulation And Rendering (DIMAR) software, and most gaming software, requires coordinated input from both the mouse and the keyboard in complex, time-dependent sequences. This is not user friendly and limits the user's ability to interact and control this software. Mouse interaction is based on instinctive hand-eye coordination, an extension of real-world sensory experience, and is (or may quickly become) intuitive. In contrast, keyboard use is dependent on identifying and pressing the correct keys or sequence of keys during software operation or during the fervor of a game. Additionally, for the game player, this may involve having to look away from the game screen, and striking the keyboard keys while simultaneously moving the mouse and pressing the mouse buttons. These actions are not intuitive. Therefore PC users may be prevented from performing at their highest potential level, since they are encumbered by the operation of current PC peripherals.

A modern PC uses the Universal Serial Bus to connect the mouse and keyboard, and other peripheral devices, to the computer. The USB connection is self-identifying and is protocol based and this makes the peripheral device connection hardware independent. This hardware independence allows any device that uses the appropriate protocol to be recognized by the PC as a standard mouse and/or keyboard, or other USB-defined peripheral device.

Interactive user input to a gaming console is typically implemented using a game pad. The game pad has a variety of buttons and XY position controls. Each gaming console uses a different connection methodology and therefore these game pads are not interchangeable between systems.

Recently, peripherals have been introduced into the PC marketplace specifically for playing games—these devices are similar to their counterparts in the gaming console marketplace and include game pads, steering wheels, joysticks, dancing pads and the like. Modern PC gaming peripherals use a USB connection method.

FIG. 1 shows a typical prior art USB-based mouse and a typical prior art USB-based keyboard. The embedded, fixed function microcontrollers detect button presses and XY movement of the mouse or key-presses of the keyboard and forward this low-level information to the PC via a standard report structure as defined by the USB Specification (available from www.usb.org). The PC handles interpretation of this report and determines events such as button clicks/double-clicks for a mouse and repeated keys for a keyboard. It also interprets the XY movement report and the scroll wheel report to implement the control functions that are defined by these reports. That is, the movement detection causes corresponding movement of the onscreen cursor, and scroll wheel movement causes line up/line down movement of the display. The intelligence for the operation of a prior art mouse or keyboard is part of the computer operating system and therefore these prior art peripheral devices could be categorized as "dumb" peripherals.

FIG. 2 shows a typical prior art game pad connected to a gaming console. The embedded, fixed function microcontroller detects button presses and XY position information and forwards this low-level information to the gaming console via a gaming console specific method. The intelligence for the operation of a prior art game pad is part of the gaming console operating system and therefore these prior art peripheral devices could be categorized as "dumb" peripherals.

The new gaming-specific peripherals introduced for the PC follow the same prior art design methodology, i.e. they are "dumb" peripherals.

Looking at the industry in general, there are more and more applications handled by computers that require special input devices. Consequently there are more and more peripheral devices. These peripherals are defined in classes. A class of peripherals shares a similar set of physical controls, a definitional set of control outputs, and a class or set of computer applications are thus supported which accept these as default inputs. Most computer applications accept input from a mouse and keyboard, but it is significant to note that applications are "dumb" and recognize inputs only from a limited number of devices specifically coded for those applications, and this necessarily limits input flexibility.

The ergonomic design of the peripheral itself, which has the greatest influence on productivity and is of great importance to the user, is a factor not recognized by the peripheral class definitions useful to applications. Since most applications accept a common, similar set of inputs, and various peripheral class devices generate these or similar outputs, users are confronted with the problem of choosing a peripheral device that fits them ergonomically but their application may not recognize it. Studies and anecdotal evidence suggests that peripherals are somewhat like shoes and must fit the user well to be most useful. Yet at this time the class nature of input control devices and their either/or support via "dumb" applications as well as platform and proprietary incompatibilities makes ergonomic use of preferred peripherals impossible without a gaggle of special after-market per-application adaptors.

A protocol to recognize and even translate peripheral actions across classes exists in the USB device descriptor tables, but there is no apparatus known in the prior art to take advantage of this capability. In summary prior art computers are controlled by the user via a variety of "dumb" peripherals, as shown in FIG. 3, and there exists an opportunity to create a new range of "smart" peripherals that are better ergonomically for the user and more efficient as data input devices.

BRIEF SUMMARY OF THE INVENTION

The present invention generally comprises a peripheral for a computer that utilizes the USB connectivity standard to deliver complex inputs to the computer. In one embodiment it is integrated into a new user input peripheral that is connected to a prior art computer system, and in another embodiment it is a standalone device connected between existing prior art peripheral(s) and a prior art computer. The integrated embodiment allows multiple device processing and more capabilities but requires a new peripheral while the standalone embodiment allows pre-existing peripherals to be used.

In contrast with prior art peripherals, this invention is classified as a "smart" peripheral. In fact, the initial implementation has more computing power that the original PC introduced by IBM in the early 1980's. The invention basically puts a local, user-programmable computer in the hands of the user that is employed to create a higher level and quality of input for the main computer.

The invention has an input section, a control section and an output section. The input section provides events to an onboard microcontroller that uses the Peripheral Action Language, or PAL, of the invention to generate the complex outputs in response to these user inputs. The microcontroller is connected to an action table that is accessed in response to any user input to determine what action should be generated in response to the event. This action table itself references a library of Local Device functions of a range of related peripheral devices for assignment or translation to the controls of the local peripheral. The microcontroller is also connected to a programmable sequence table so that a sequence of actions may be generated in response to an event. The output section implements the protocol of the chosen computer and emulates a standard device of this computer.

In the simplest case, the input event can generate a report identical to that of a standard device such as a mouse, and it could therefore appear to act just like a standard mouse to the computer. The action table may also specify that a standard keyboard report be generated and therefore the invention can also create input to the computer in a fashion identical to the input generated by a standard keyboard. Similarly, the action table could specify that reports for a range of other devices such as game pads or joysticks could be provided to the PC. The action table is programmable by the user so that the user can define the actions that are generated as a result of an input event. The user-programmable action table allows a sequence of actions to be generated from a single input event. The invention includes non-volatile memory such that it maintains all programming information even after power has been removed.

It is significant that the microcontroller, action table, and sequence table are all located within, or adjacent to, the peripheral, and may be programmed and altered at the desire and whim of the user. Thus the actions generated by the invention are independent of the computer to which it is connected. Indeed, the invention may be connected to any computer that accepts any of the peripheral interface standards to which the invention adheres, such as USB, PlayStation, GameCube, and the like. The actions and sequences that the user finds valuable and effective are embodied in the invention, which may be moved from computer to computer and used with equal effectiveness and efficiency.

Existing prior art peripherals can be connected to the standalone version of the invention via a direct plug-socket connection or via an adaptor. The preferred method is via an adaptor that converts the proprietary connector and protocol into USB standard connector and protocol.

The invention is superior to prior art devices, which cannot generate complex actions and sequences. The invention's library-referenced Local Device function translation allows prior art "dumb" peripherals to be connected to any computer, to which they were formerly not compatible to provide functionality in common. It is significant that no special software is required on the computer since the invention emulates one, or a collection of, standard peripherals that are already supported by the computer.

In one implementation of the integrated version, the invention comprises a DIMAR/Gaming mouse that is controlled using a defined Peripheral Action Language. This invention can emulate any Human Interface Device, or HID as defined by the USB Specification, such as a mouse, keyboard, or joystick and can do so concurrently such that a computer responds as if these several independent devices are connected. The invention includes innovations that allow this single device to perform the coordinated sequences required by modern software in a simpler and more intuitive way for the user. The invention, as an embodiment of PAL capability, allows complex repetitive keyboard and mouse sequences to be pre-programmed and easily accessible. It may also free up one of the users hands such that they can be more efficient and productive. Since the invention operates as a virtual collection of standard peripherals, no change in computer system software is required for it to function. Additionally since no special drivers are required, this invention will benefit Windows, Apple, Linux and embedded systems that implement the USB HID standard protocol.

The defined Peripheral Action Language describes actions that can be generated by input events. These actions may be programmed to translate to the device that the invention is emulating. The invention is capable of emulating any prior art "dumb" peripheral. PAL enables complex action reports, such as, but not limited to, the following:

1. Peripheral Action Language, PAL—The protocol allows the peripheral to communicate with the computer and, more specifically, the game engine, through a command set that emulates any standard prior art peripheral device or a collection of such devices. Additional capability is possible from this collection of devices.
2. 8-way scroll—An extension of the standard up/down mouse scroll such that it is usable in 8 directions and can allow a parallel selection of 1 of 8 actions by moving the mouse in one of eight compass directions.
3. Anti-Spin—A governing implementation to prevent excessively rapid mouse movement and errors. This function is similar in concept to ABS vehicle braking technology, in that movement velocity outside an acceptable range is detected and acted upon.
4. Auto-Strafe—An implementation where the key-press component of optimal game turning is automatically generated by the invention based on evaluation of the acceleration of mouse input, saving the user the coordinated key-press task.
5. Rotate function—Using two, laterally opposed, optical sensors, the angular rotation of the mouse about its central vertical axis is calculated and provided to the computer. This allows the invention to output X, Y and Z information to the computer for use as a 3 axis controller translating physical rotation of the device into theta, or the z axis input.
6. POV steering—An implementation whereby the cursor on the desktop moves independently of gross mouse motion such that a relatively small amount of mouse rotational movement steers the cursor.
7. Lift event—An optical event is generated when the invention is lifted from the desktop. This is used to create an action. Lifting a mouse is an ergonomically efficient way of transmitting a "reset" type action to the computer. It may be used advantageously, for example, to direct a game figure to carry out a jump action.

In one implementation of the standalone version, the invention provides an independent electronic module that is designed to impart the full functionality of the PAL system to prior art peripherals that were manufactured previously and lack its components and concept. The module includes a microcontroller and action table and sequence table embodied in a programmable memory format, and also includes a plurality of ports for connection to USB and equivalent devices. In addition, it includes ports that are adapted for connection to typical game machines, such as PlayStation, Xbox, and the like. Prior art peripheral devices may be connected to the module and PAL features of the module may be added to these peripheral devices. The programmed sequences remain stored in the module, so that the module may be moved from one machine to another, cross-platform and cross-game machine, to enable the users to employ their desired complex actions and sequences in response to standard reports from "dumb" peripheral devices.

BRIEF DESCRIPTION OF THE DRAWINGS

FIG. 3 is a block diagram showing connection of prior art "dumb" peripheral input devices to a computer.

FIG. 7 is a block diagram depicting the acceleration limiting anti-spin function of the present invention.

FIG. 8 is a block diagram depicting the timing inputs for the auto-strafe game function of the present invention.

DETAILED DESCRIPTION OF THE INVENTION

The present invention generally comprises a peripheral system for a computer that utilizes the USB connectivity standard to generate complex inputs to the computer. Prior art computers are controlled by the user via a variety of "dumb" peripherals. The invention puts a local, user-programmable interface in the hands of the user that is employed to create a higher level and quality of input for the computer, in effect controlling the computer with "smart" peripherals.

Figure 1:
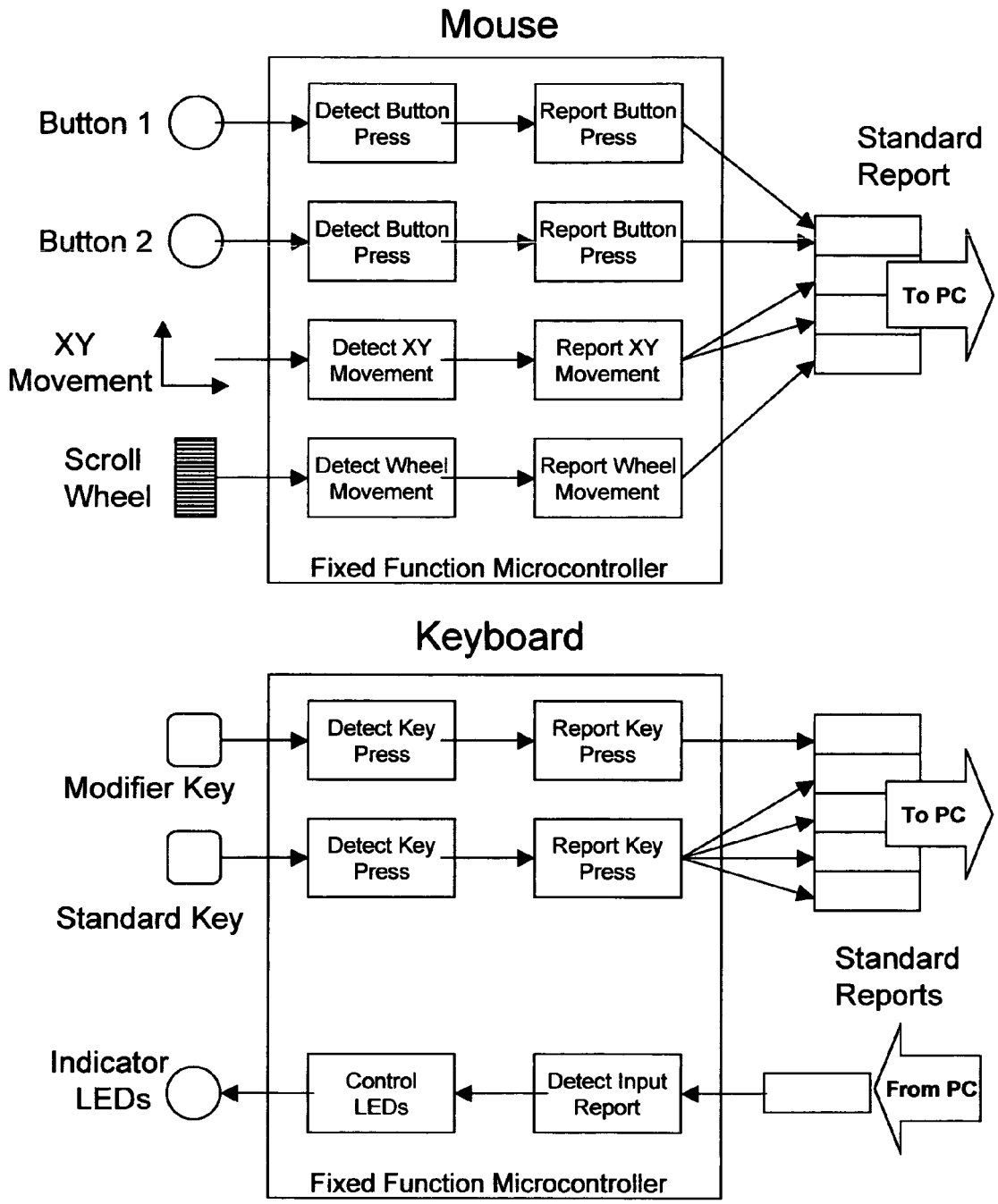
FIG. 1 is a block diagram of the functions of typical prior art PC peripheral input devices.
Figure 2:
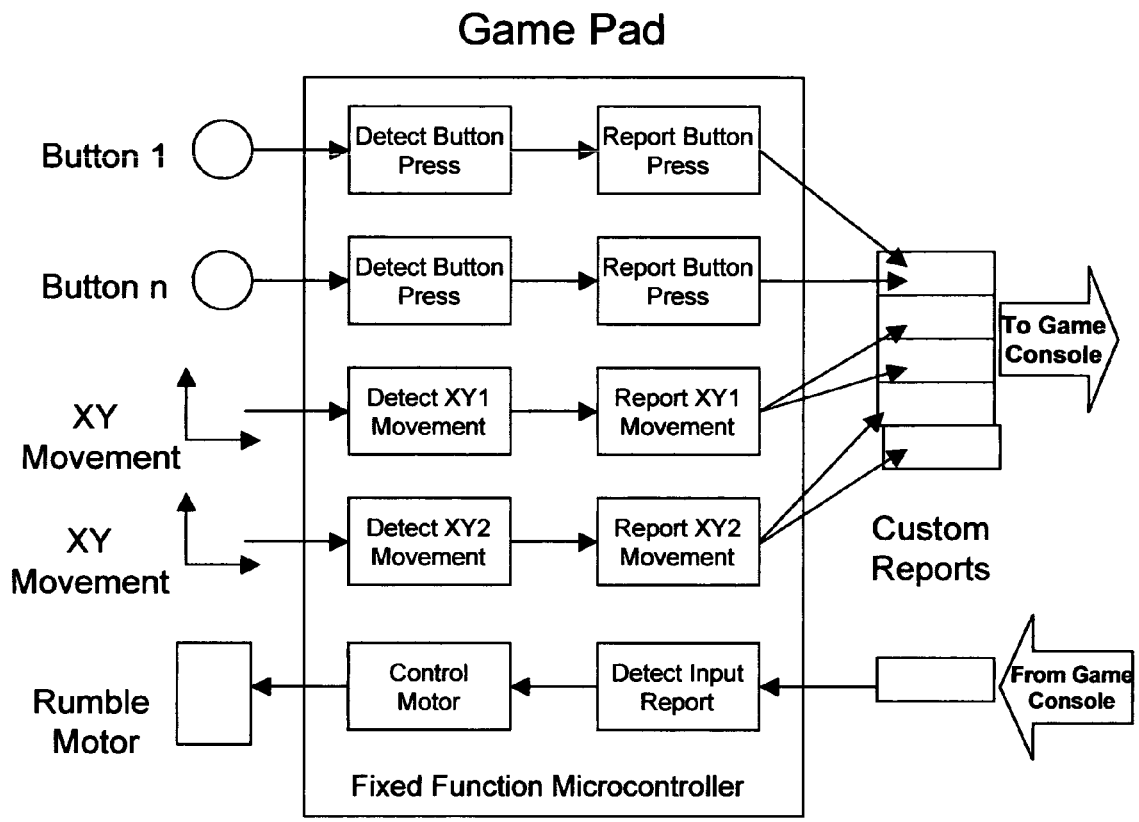
FIG. 2 is a block diagram of the functions of typical prior art game console peripheral input devices.
Figure 4A:
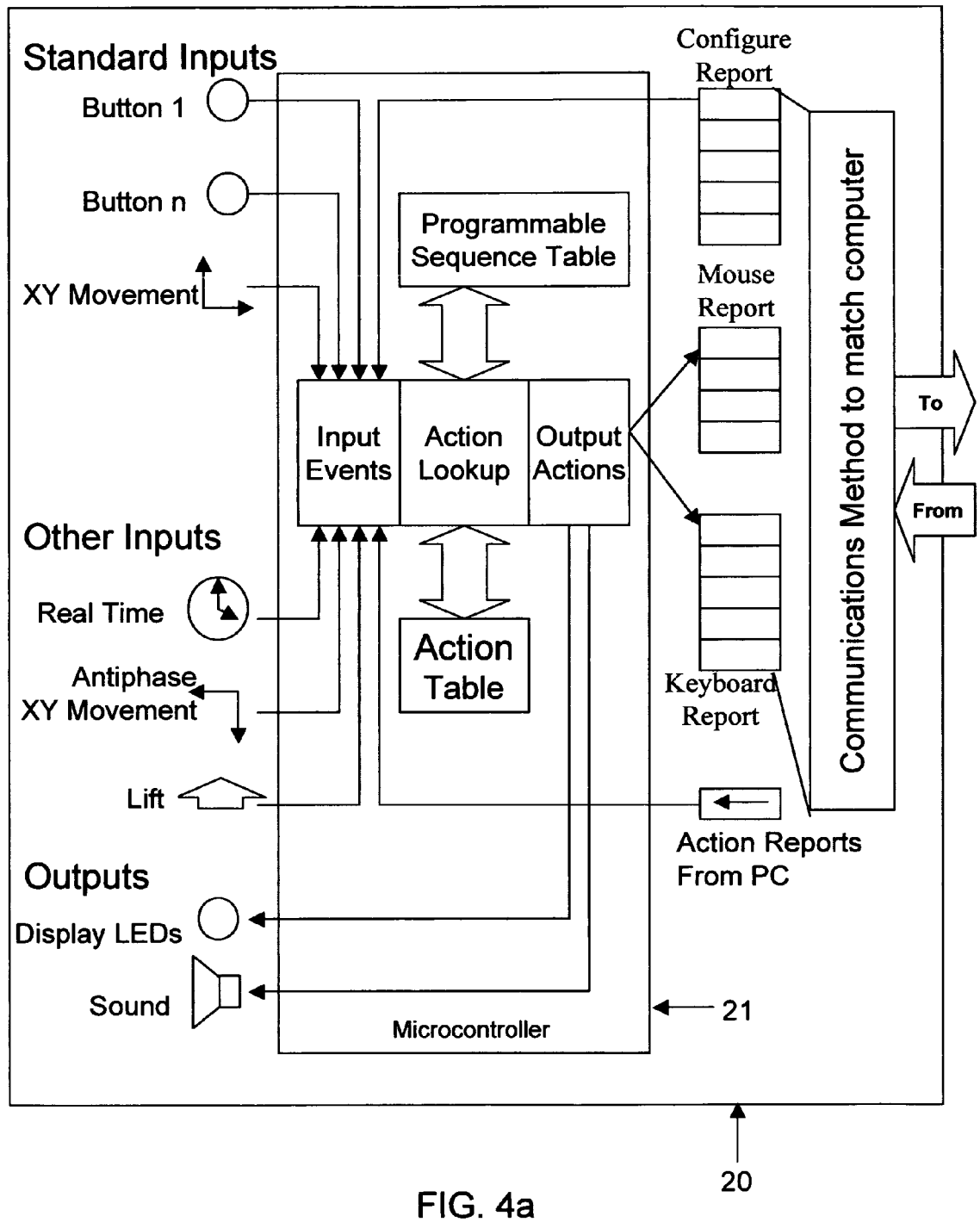
FIG. 4*a* is a block diagram depicting the functions of an integrated embodiment of a "smart" peripheral using PAL technology in accordance with the present invention.

With regard to FIG. 4*a*, the peripheral input system includes a generalized computer input device 20 having a microcontroller 21 running the peripheral action language (PAL) of the present invention. The input device 20 may receive inputs from buttons 1 through n, as well as XY movement signals, such as those from the movement sensor of a computer mouse. Other inputs may include, but are not limited to, real time input from a clock source, antiphase XY movement and lift events, described in greater detail below. The similar input device 20', shown in FIG. 4*b*, may receive inputs from prior art USB devices and from prior art game controllers, such as a mouse, Game Pad, steering wheel, joystick, gun, and the like via a direct connection or via an adaptor.

All of the inputs are fed to an input events section of the microcontroller 21, and thence to an action lookup portion of the microcontroller. The action lookup function is connected to an action table that stores a direct correspondence between the inputs and a related output action. In addition, the action lookup function is connected to a programmable sequence table that stores a direct correspondence between the inputs and a related output sequence of actions. Both the action table and the sequence table are programmable by the user through a configuration report that may be generated by a connected PC under the direction of the user. The input events that generate a response from the action table are mutually exclusive from the input events that generate a response from the sequence table. The responses from the action table or sequence table are fed to an output action portion of the microcontroller, and delivered to the computer as a mouse report, as a keyboard report or as any other report that is defined by the USB specification or by the game console implementation. Thus the input device may be made to appear to the computer to be a device other than what it is actually. For example, a mouse input event may be programmed to generate an output action that would otherwise be generated by a keyboard (e.g., a keystroke or keystroke combination). Likewise, an XY movement in a predetermined direction or length may be programmed to generate an output action that is not a cursor movement. An extremely broad and robust set of actions and sequences may be programmed into the microcontroller 21, at the direction and desire of the user of the input device 20.

Figure 4B:
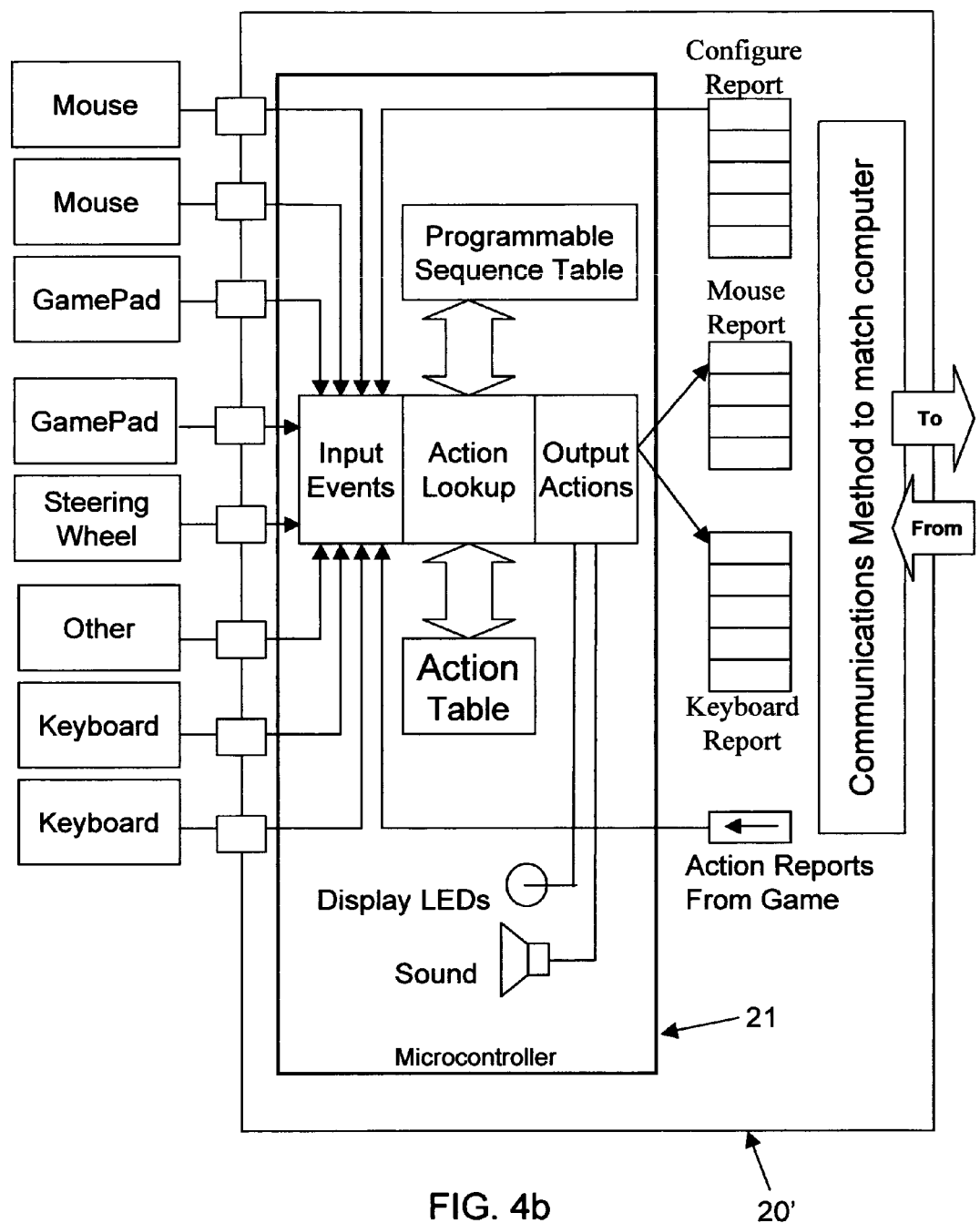
FIG. 4*b* is a block diagram depicting the functions of a standalone embodiment of a "smart" peripheral using PAL technology in accordance with the present invention.

As depicted in FIGS. 4a and 4b, some of the output actions may comprise annunciator actions (light, sound, vibration, feedback to a game input device) that are directed to the device user. They may be emitted by the computer, or by the invention, (display LEDs, sound outputs or similar), or by some combination of the two, or by other ancillary output devices. Note also that action reports from the computer or game are received as input events to the microcontroller 21, which may generate further programmed actions or sequences by the microcontroller 21.

It is a significant and salient aspect of the invention that the programmed actions and sequences are stored in non-volatile memory associated with the microcontroller 21, and thus are incorporated into the invention independently of any computer or game to which the invention 20 may be connected. Thus, for example, the actions and sequences that the user finds valuable and effective are stored in the invention, which may be moved from computer to computer and used with equal effectiveness and efficiency. In addition, the action report loop from the computer (or game) to the input events section of the microcontroller enables the microcontroller to detect the computer or game to which it is connected, and to tailor the action lookup function to the game being played or the computer being controlled.

The invention may provide a wide variety of complex action output sequences. The following list describes some action outputs that are useful in game playing.

1. PAL Game Engine Protocol:

Prior to this invention, the only way that a universally supported generic pointing device could send input into games was via the standard mouse and keyboard reports to the computer. The device would interface with the computer's standard input, and the game would process the signals relayed through the standard input. By contrast, this invention includes microprocessor functions that emulate the standard computer controls and directly interact with the game variables through a database stored in non-volatile memory inside the invention. PAL protocol is a microprocessor based program controlling both input peripheral behavior and its interpretation, translation and/or transmittal to the computer as peripheral actions. It uses a library of Local Device functions (Keyboard, Mouse, Joystick, Game Pad, etc,) to process input events and Peripheral Emulation functions to translate and transmit them to computer applications and programs. These functions are used to automate and achieve improved peripheral performance and reduce ergonomic stresses associated with input to these applications. The invention performs these functions and variable manipulations in real-time.

Figure 5:
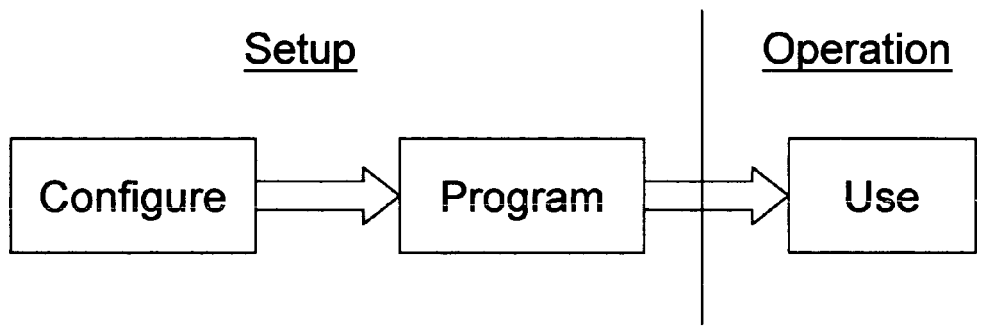
FIG. 5 is a block diagram depicting the user programmable function of the present invention.

The invention uses three steps, as shown in FIG. 5, to provide programmable features to the user. A user pre-determines an action or sequence of actions that each input event will create during the Configure Phase by writing a PAL input file. A software tool generates a run-time database from this PAL input file and this is downloaded into the invention during the Program Phase. This information is stored inside the invention in non-volatile memory so the user-programmed actions travel with the invention and are thus available if the invention is transported and attached to a different computer. During the Use Phase all of the pre-programmed actions are readily available for use. The user may move through the configuration, programming, and usage phases as many times as desired.

As one example, in a typical mouse of the prior art a single mouse click is linked to one action. The pressing and releasing of a mouse button is one event. The current invention is capable of distinguishing between 4 types of user button press behaviors and assigning a separate action to each. The invention can distinguish between 1) a single button click (a quick tap), 2) a conventional double click, 3) the initial button down transition of any longer duration button press, and 4) the release of the button. It can be seen that in the case of 3) and 4), a single button press can yield two results, and the timing between the events is a function of the (single) button press duration. For instance an output left click action could be initiated from 3) the button down detection, and another left click action could be sent when the button release is detected. The result is a timed double click, accomplished with a single button press. The user can link the same, or any two arbitrary actions together in the button press. When the programmed action is the same, the effect is an "echo" of the first command, and in all cases, button actions can be generated with half the work, or twice as fast as with a prior art mouse. In addition, the user can change the time interval between the mouse down action and the mouse up action by simply holding the mouse button down for a desired amount of time.

Inclusion of real-time and sequences into the Peripheral Action Language allows a single input event, such as a button press, to generate a series of precisely timed actions that could include, but is not limited to, single or multiple button down actions, button up actions, mouse XY movement, and any combination of keystroke actions.

The invention can send messages to the game in order to manipulate specific variables that control game play. A game, or other software, may be designed to be PAL aware. It may write specific variables to the invention to control its operation such as light pattern or sound. For example, the invention could react to a game's "health" variable. As the user's health ebbs, the device of the invention could respond with increasingly rapidly flashing lights. Such lighting effects are detectable by a user's peripheral vision, thus adding another function to the invention and to the operational definition of the invention and extending machine/user feedback beyond the monitor/speakers paradigm currently the norm.

2. 8-Way Scroll:

Some prior art pointing devices incorporate a scroll wheel that is supported by programs that have implemented the scrolling form of input. Some mice also use a "universal scroll" button, but this implementation too must be supported by the individual game or business application in order to function properly. Both the scroll wheel and "universal scroll" are serial scrolls. The user must iterate through all the points between their current location in a list and their target location. In the pathological case a user would have to traverse an entire list to select the appropriate item. This invention addresses the problems of software scroll implementation and serial scroll through a feature called 8-way scroll.

Figure 6:
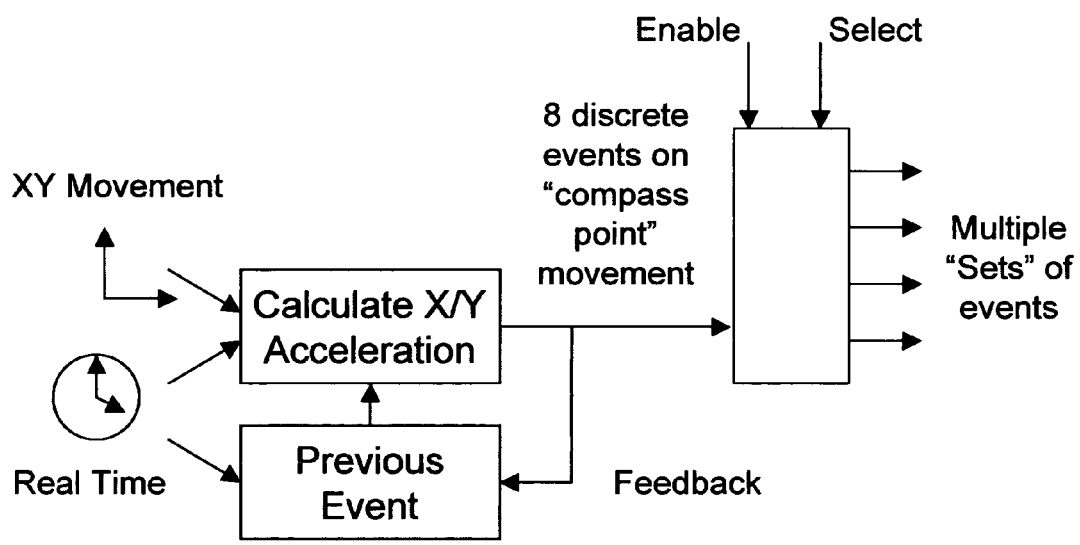
FIG. 6 is a block diagram depicting the 8-way scroll function of the present invention.

With regard to FIG. 6, an event (typically a button press) can place the invention into 8-way scroll mode, where, instead of generating continuous XY movements based on signals from the XY movement sensor, 8 discrete events can be detected from mouse movement as they align with the 8 primary directions on a compass rose (N, NE, E, SE, S, SW, W and NW). This allows the user to select any one of eight action options by making the corresponding directional movement of the input device. The system calculates the XY acceleration, determines if it is within a real time limit, determines the closest compass direction, looks up the programmed action for that direction, and outputs that action to the computer or game. Once the 8-Way Scroll is deactivated, the invention returns to the normal action of generating XY location values relative to the user's movements. This feature is superior to a serial scrolling device because it works in parallel. The user can select any of eight possibilities in one movement; whereas, a serial scroll device must scroll through all eight elements to move from the first to the last value. The added speed value of 8-Way Scrolling is crucial in gaming where small fractions of time mean the difference between success and failure.

The 8-way scroll feature supports multiple sets of selectable actions as shown in FIG. 6. A user will typically select a set of actions that matches the software that currently being used.

3. Anti-Spin

In contrast to coordinated finger movement, the lateral movement of the wrist is created by muscles in the forearm, and these have relatively poorer leverage and precise position control, which shows up in quick game play as the tendency to move a mouse too far and/or too fast, a problem deriving from adjustment to the weight and mass of both the moving hand and device. The deleterious effect of "overshooting" in game-play is to lose one's orientation. Imprecise movement can unintentionally leave one's avatar with their back to his opponent, rarely to good effect. Additionally most mice "skip" and lose tracking when moved too quickly which further interferes with game control.

To overcome these deficiencies in the prior art, the present invention implements an anti-spin function, as shown in FIG. 7. The microprocessor monitors the changes of both X and Y axis input events in real time and, when the acceleration exceeds a level predefined by the user, signals an event. This event will cause a pre-programmed action to run. Typically this would be to disable the passing of further X/Y offset information to the system, effectively "braking" the movement before control is lost. Alternatively, an automatic movement sequence may be initiated that could result in placing the player in an "about face" position, as another method of producing the desired effect of quickly turning around. In gaming, the user would never want to turn the avatar (player) further than 180 degrees from their beginning position, since, for turns over 180 degrees, rotating in the opposite direction would be quicker. The implementation of the anti-spin feature regulates the mouse acceleration similar to anti-lock braking systems as implemented in vehicles to prevent loss of braking control. The user can define the threshold at which they wish the invention to take control of the action, as well as the action to take via variables and sequences programmed and downloaded to the device memory.

4. Auto-Strafe

In today's state-of-the-art first person games, the simple operation of moving one's avatar in the game world requires coordinated keyboard and mouse operation; the keyboard to press "movement" or thrust keys, and the mouse to supply steering (and aiming) relative to the movement. Specifically, four keys are used, each for one of 4 orthogonal motions; forward, right, left, and back. The game engines process keyboard input such that concurrently pressed keys result in combined motions—a forward and right key-press combination will result in a forward oblique to the right, whereas a combination forward and back or right and left will cancel and result in no movement. A tactic essential to gaming called circle strafing requires a specific combination of motion keys to be pressed while circling and firing at an opponent. Circling puts an opponent at a disadvantage, and as players attempt to "circle-strafe" each other, the coordinated ability to synchronously switch and operate motion keys while weaving with the mouse can be decisive.

Obviously the interaction of the motion key with the direction of mouse steering is rule based and the invention is capable of implementing the appropriate side motion key-presses independently of direction and automatically to effect circle strafing, based on analysis of the direction and delta of the X axis input. As a player turns (increases lateral movement of the mouse) acceleration is created which then is tested for a limit level to enable an auto-strafe event sequence as shown in FIG. 8. The auto-strafe event uses the PAL syntax to create an action such as a keystroke corresponding to the appropriate sideways motion to accompany the mouse-steered circle strafing. With auto-strafe enabled, the gamer can circle strafe effectively by steering the mouse and using only backwards and forwards movement keys. The auto-strafe implementation is meant to provide an improved ergonomic to effect precise circle strafing performance without the need to press the sideways motion keys, eliminating their mis-keying, and freeing both concentration resources and two fingers to be used to other advantage.

5. Rotate Function

Figure 9:
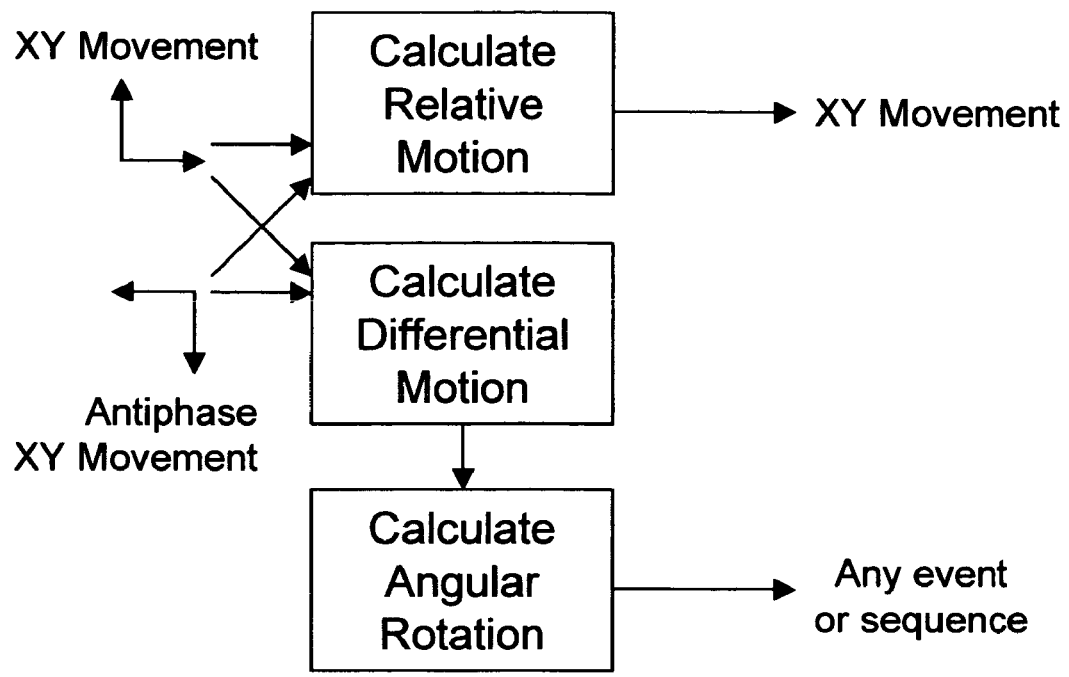
FIG. 9 is a block diagram depicting the two sensor rotation measuring function of the present invention.

An integrated implementation of the invention having dual optical sensors (described below) may be used to translate device rotation directly to game rotation. The two optical sensors are secured in the base of the mouse in a laterally spaced apart fashion to provide dual antiphase inputs to the microprocessor that enable rotation of the mouse about an axis that passes vertically through the mouse. The two sensor signals are evaluated mathematically to determine the absolute positioning of the device as shown in FIG. 9. The microcontroller 21 calculates the differential motion from the two optical sensors, and analyzed to ascertain whether the two signals indicate antiphase movement (in which the X or Y movement from the two sensors are in opposed directions). From this analysis the microprocessor can calculate the resulting angular rotation and express the rotation in degrees. In some DIMAR applications the output as rotational data is directly usable. In others as well as in gaming applications, the delta component of the movement is processed to supply game rotation via X axis mouse movement data. For non-gaming applications, the calculated mouse rotation may be used to create a virtual rotatable knob adjustment function for control of a variable such as audio volume, brightness, hue, frequency, tuning, and similar functions known to be controlled in the prior art by knob rotation. In all cases the importance of the entire sensor and microprocessor function is to enable the physical efficiency of the device rotation as signal generation to the PC.

Not only is rotating a mouse(device) to effect rotation of view in a game more intuitive, it is also easier and far more precise than the equivalent lateral motion. The opposable thumb/finger architecture of the human hand, evolved specifically for grasping, is ideally suited to rotate forms that fit within the grasp. The muscles involved are local, well leveraged, and capable of fine motor control as has been amply demonstrated in the literature and accomplishments of musicians, artists, surgeons and other practitioners of manual skill. The history of instrumentation has shown that the circular dial is the control of choice, and the device as described above is in essence a circular PC dial. Conversely the repetitive lateral wrist movement (it replaces) required of the conventional PC mouse has been clearly identified in the industrial literature as one of the principle risk factors for Carpel Tunnel Syndrome.

This implementation of the rotate function is especially useful in the Digital Image Manipulation And Rendering (DIMAR) industry. Specifically, color is often presented in the form of a wheel; and it is far more natural to adjust the tone or shade of a color using an input device that rotates. Using devices of the current art, DIMAR technicians must push a mouse or scroll wheel gently back or forth to change the shade and intensity of a color. With this invention one can simply dial in the appropriate color shade by rotating the device, and intensity may be controlled by y-axis movement. Prior to the advent of the digital revolution, color manipulation in this field was done using circular mechanical dials. The dials were a successful ergonomic; and were replaced by the desktop mouse in PC based applications to date in what is viewed as a necessary but awkward bridging of the ergonomic control input issue, as there has not existed an equivalent digital device. This aspect of the present invention fills this technology gap.6. POV-Steering An even more fundamental reduction in mouse handling ergonomic stress is obtained from the invention's Point-Of-View, or POV, steering implementation. It should be noted that in both the case of prior art and above described implementations of the current invention, change in cursor or game view direction is obtained by control movement. The cursor is moved by mouse movement. Without movement, the player doesn't move and can't be directed. Similarly, rotation of the players view, or steering of their path when moving, is effected by lateral or rotational movement of the mouse. While the concept of POV steering has a different application to effect in both cursor and game avatar movement, both are examples where movement is largely supplied by controller movement, and can be improved. The cursor control of the prior art is comparable to traveling or moving via walking; steering and movement are combined, and without movement (mouse translation on a surface) there is no way of turning. The POV steering implementation breaks the cursor/mouse motion dependency and allows the mouse to "steer" the cursor with relatively little or no translation movement.

This is an important improvement afforded by the invention as applications are increasingly mouse driven and industrial studies have estimated as much as 30 percent of computing time may be devoted to moving the cursor between clickable locations on the screen. In POV steering implementation mode, mouse movement signals are produced by the invention at a frequency appropriate to drive the cursor across the screen at a usable speed, and while X axis, Y axis, or both are sent automatically to the system causing smooth cursor travel, the real time sensor output derived from rotating the dual optical sensor version of the invention like a steering wheel is used to modulate the timing or spacing of microprocessor generated cursor displacement signals. The effect is to produce smooth steering of the cursor with a small range of physical rotation of the device. The POV steering mode requires a control dedicated to brake, stop or toggle the cursor movement, such as a single key-press, button press, or lift event, to reduce mouse movement by a significant amount. In POV steering mode, cursor pointing ergonomics would be analogous to traveling or moving via an automobile, where the steering effort is independent of motive power and is an order of magnitude less.

Figure 10:
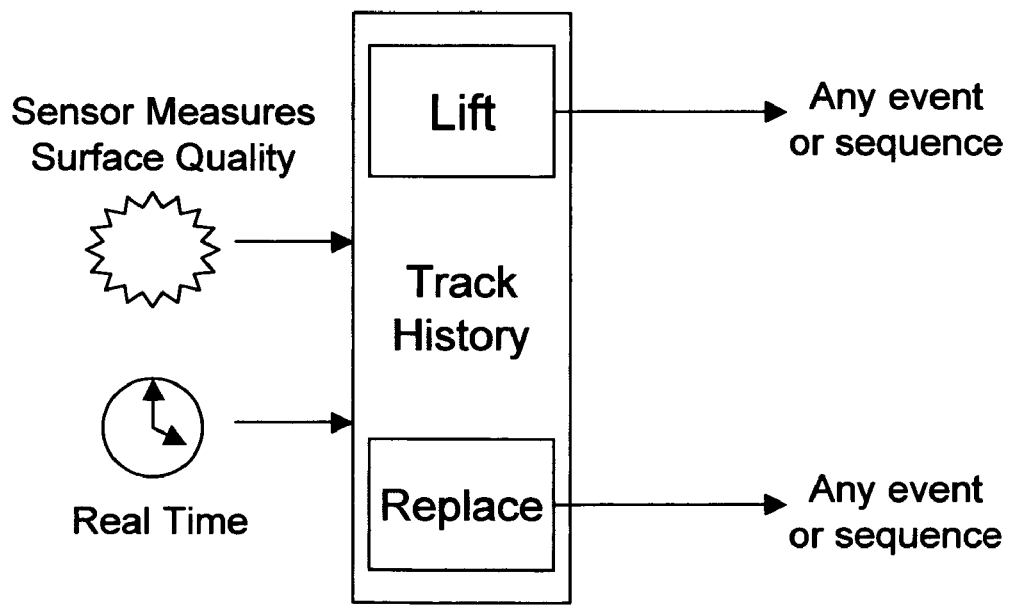
FIG. 10 is a block diagram depicting lift/replace and surface quality tracking functions of the present invention.

In the computer game environment, the implementation of POV steering mode affects the pressing of motion keys rather than mouse movement but has the same effect of steering the player's motion with little movement of the mouse and reduced user need to press motion keys.7. Lift Event An integrated embodiment of the invention can make use of the inclusion of optical navigation technology in the device to provide the user with an additional control event (like pushing a mouse button); the lifting of the mouse from the desktop (Optical Lift Event). State of the art optical navigation sensors can continuously monitor the quality of the signal reflected from a surface. This information may be processed and the local microprocessor 21 can determine when the mouse has been lifted from the surface and, in response, generate a lift event as shown in FIG. 10. This event can generate an action in the same way that a button press event can generate an action. It can be passed to the computer as a mouse or keyboard event, such as a left click, or for use with other firmware programming as a "cancel" or "reset" function to abort currently running sequences. Another programmed action for a lift event may be a jump movement of a game avatar.

An integrated embodiment of the invention in a mouse form is ideally small and light, so lifting it is a quick and easy action for the user. Gamers are frequently practiced in lifting a mouse for performance reasons, so utilizing the Optical Lift Event in a gaming context is both practical and familiar.

Figure 11:
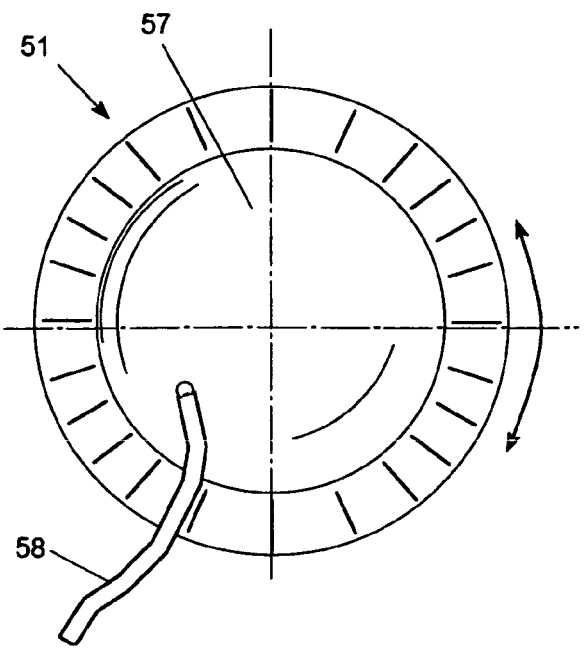
FIG. 11 is a top view of an integrated embodiment of the invention in the form of a mouse input device having a cylindrical form factor.
Figure 12:
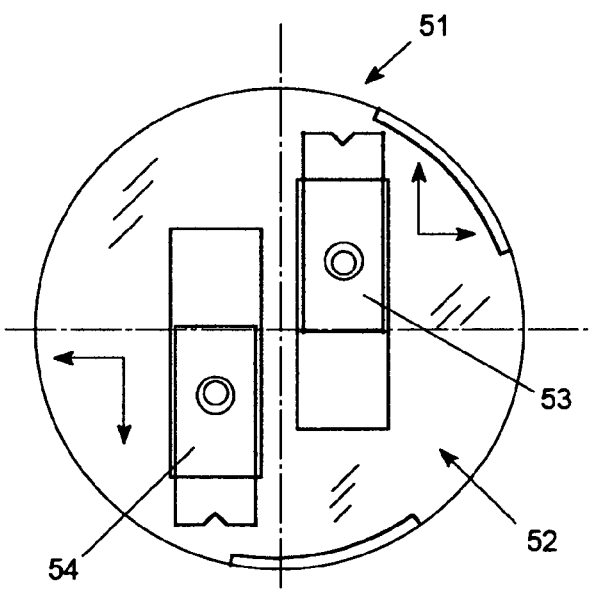
FIG. 12 is a bottom view of the mouse shown in FIG. 11, depicting the two optical movement sensors of the mouse.
Figure 13:
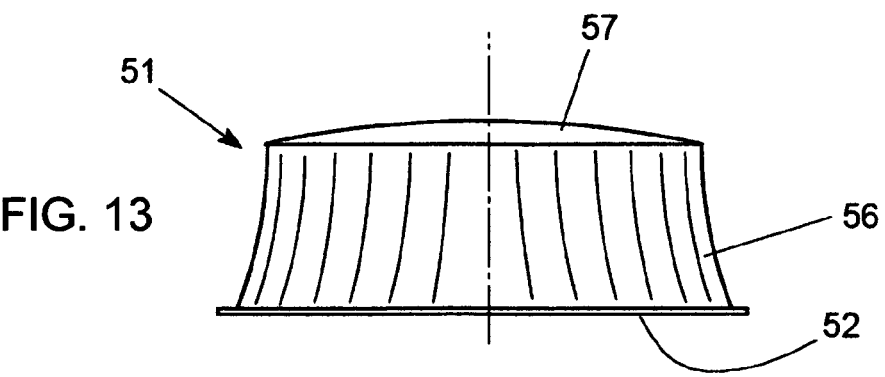
FIG. 13 is a side elevation of the mouse shown in FIGS. 11 and 12.

It may be appreciated that other actions or sequences may be devised for the system of FIGS. 4a and 4b that improve the convenience and efficiency of a computer input device. The combination of the microcontroller 21 and the programmable action table and sequence table provide an adaptable system that enables the user to create complex action outputs that suit whatever activities. applications, and systems with which the user is interacting. With regard to FIGS. 11-13, an integrated embodiment of the invention is shown in the form of a cylindrical mouse input device 51. This configuration is a good implementation for the rotation function and the POV steering function of the PAL system. as mentioned previously in the description The mouse 51 includes a generally circular base 52 in which a pair of optical movement sensors 53 and 54 are secured symmetrically in diagonally opposed Cartesian quadrants and directed downwardly to a supporting surface to detect XY translation of the device. The sensors 53 and 54 are conventional devices known in the prior art, but their use in antiphase movement detection is considered novel. A generally cylindrical sidewall 56 extends upwardly from the base 52 in coaxial arrangement therewith, the sidewall being provided with a slight concave curvature in vertical elevation, as shown in FIG. 13, to enhance grasping by the fingers of the user's hand. A dome-like top panel 57 extends contiguously with the top edge of the sidewall 56 to enclose the mouse, and a cable 58 extends from the sidewall 56 to the computer.

Figure 14:
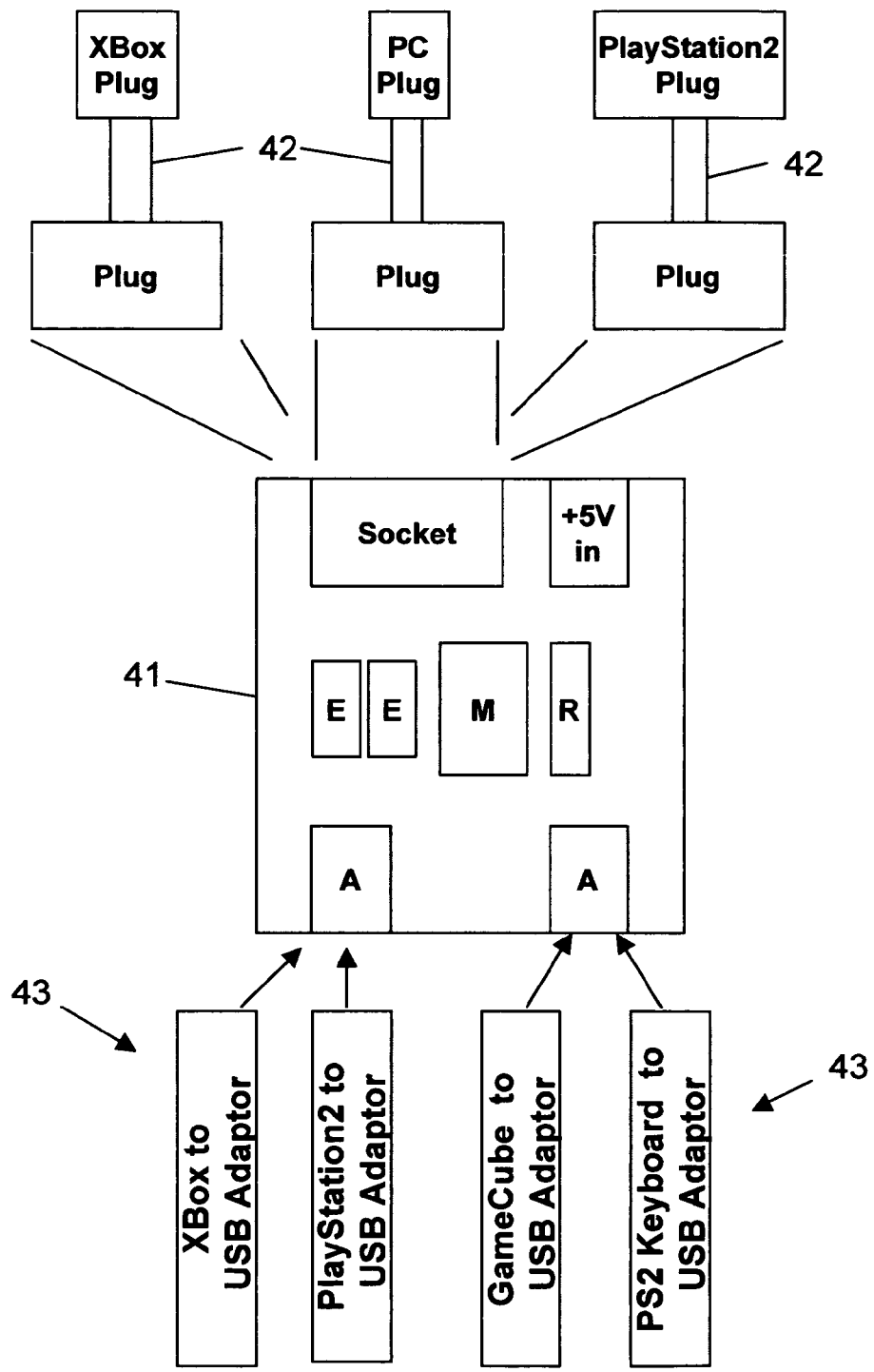
FIG. 14 is a block diagram of a standalone embodiment of the invention comprising a module for connecting a plurality of prior art peripherals to a computer system.

The mouse 51 provides the optimum format for supporting and exploiting the two sensors 53 and 54 for rotation and POV steering functions described above. The cylindrical sidewall has the feel and dimensions of a typical adjustment knob, and is inherently familiar to any user attempting to rotate the device. It facilitates fingertip control for rotation inputs, and for typical XY translation movements of the mouse. Indeed, the mouse 51 provides an excellent fingertip mouse function for fine motion control without ergonomic stresses to the wrist and carpal tunnel of the user. The mouse 51 may also include user input buttons mounted on the top panel 57 and sidewall 56, as well as indicator lights or LEDs for user feedback. With regard to FIGS. 14-15, a standalone version of the invention is shown in the form of a stand-alone module 41 that incorporates all of the functional components necessary to impart the PAL system to prior art peripherals that lack the PAL functions. The module 41, which may be housed in any conveniently shaped enclosure, includes a microcontroller M (corresponding to microcontroller 21 described previously) that is connected to RAM R and to EEPROM chips E for non-volatile storage of actions and sequences, as described above. A socket is provided to enable connection to a cable 42 having a mating plug at one end and a computer compatible plug at the other end. For example, the cable 42 may have an Xbox plug, or a PC plug, or a PlayStation2 plug, so that any of these computers may be connected to module 41.

The module 41 also includes a plurality of USB connectors A that are standard USB sockets. The invention also provides a plurality of adaptors 43 that are designed to permit connection of input devices having proprietary connectors to the USB sockets A. For example, the adaptors 43 may include Xbox to USB, PlayStation2 to USB, GameCube to USB, and PS2 keyboard to USB adaptors. The adaptors enable the use of prior art peripherals designed for their corresponding game consoles to be employed with the PAL gaming system of the invention, as described above. It may be appreciated that the microcontroller M and EEPROM E are connected to the game connector and the USB connectors A to implement the method and functions of the PAL system of the invention, even though the game playing devices connected to the USB ports A do not have onboard PAL functions. Thus the benefits of the invention may be applied to a wide variety of game devices that are already existing or are not manufactured in accordance with the present invention. Note that the inputs may be expanded via a standard USB hub, so that more than two devices and more than two players may use the invention concurrently. Indeed, the module 41 may derive power from a USB connection, or other powered connector input.

Figure 15:
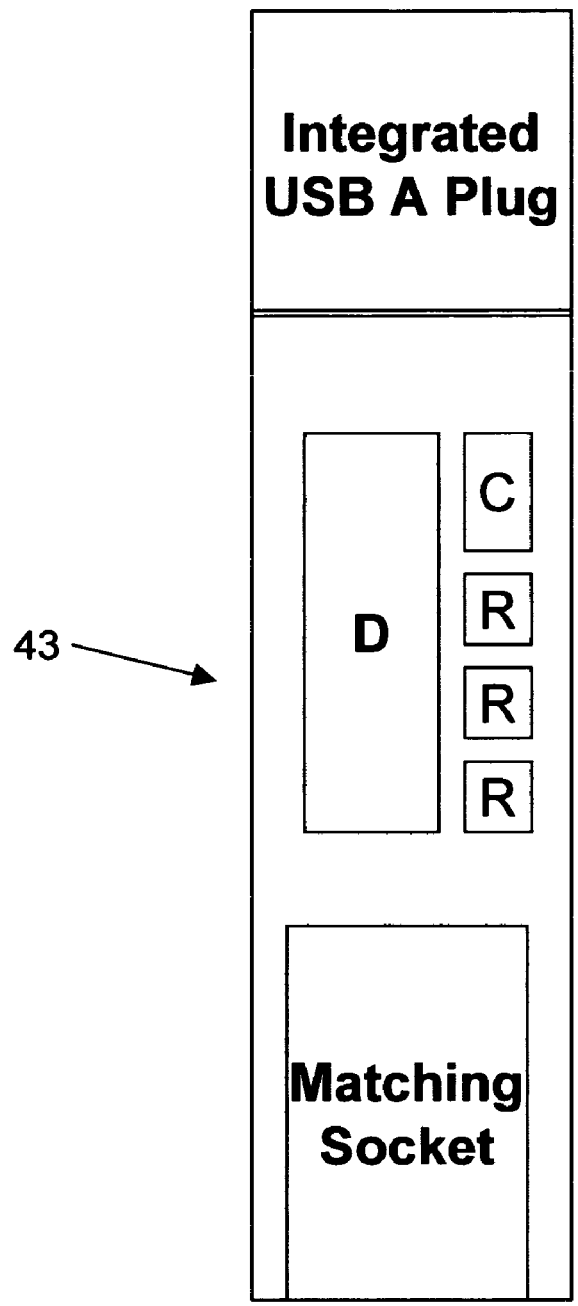
FIG. 15 is a block diagram of a plug adaptor for use with the module depicted in FIG. 14.

With regard to FIG. 15, each adaptor 43 includes a USB A plug at one end, and a matching socket that is adapted to mate with the proprietary game controller connector of the respective game console controller. A microcontroller D is connected between the USB plug and the matching socket, and also connected to ancillary components capacitor C and resistors R. The microcontroller D provides the signal flow management that enables the proprietary game controller to communicate with the PAL system of the invention.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A peripheral device for a computer, including:
   a microcontroller running a peripheral action language program, said microcontroller having:
   means for receiving input events generated by a user;
   action lookup means for correlating input events with dissimilar output actions;
   said action lookup means including a library of peripheral emulation functions stored in a non-volatile memory and adapted to run under the peripheral action language program;
   output means for transmitting said output actions to the computer;
   said device being adapted to be moved by a user on a surface in an XY plane and including a movement sensor for detecting movement of the device on the surface in the XY plane, and one of said input events comprising a movement signal from said movement sensor;
   said movement sensor including an optical movement detector, and said input event comprising a lift event in which the user raises said device from said XY plane and lifts and separates said device from said surface a sufficient distance so that said optical movement detector breaks optical contact with said surface in the XY plane.

2. The peripheral device of claim 1, wherein said output action comprises a reset function in the computer.

* * * * *